Sept. 11, 1951 W. TAMMINGA 2,567,683
MILK DISPENSER WITH QUANTITY REGULATOR
Filed May 7, 1948
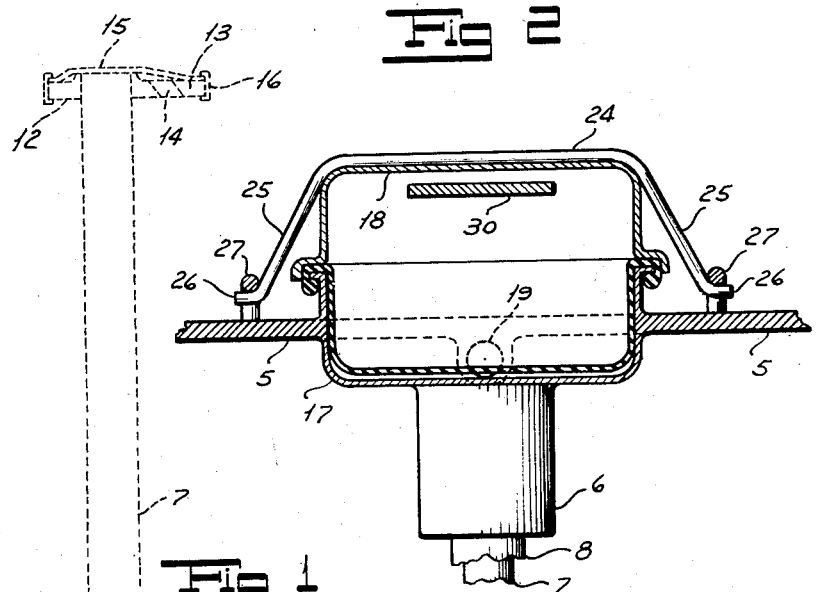
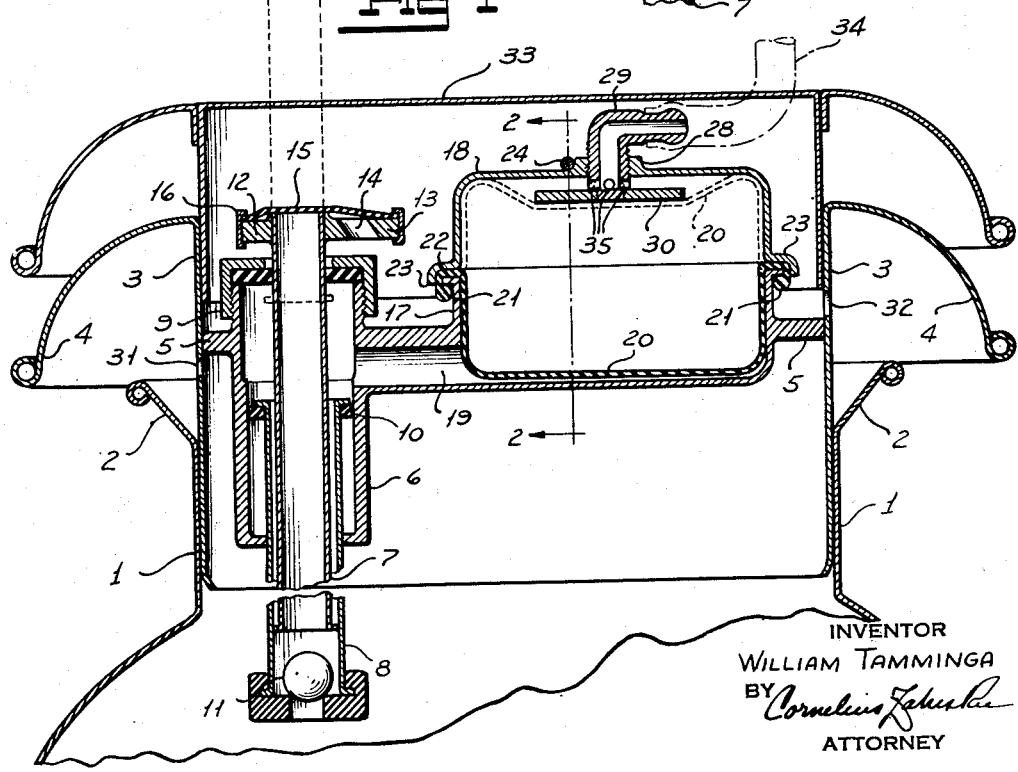
INVENTOR
WILLIAM TAMMINGA
BY
ATTORNEY Patented Sept. 11, 1951

2,567,683

UNITED STATES PATENT OFFICE 2,567,683

MILK DISPENSER WITH QUANTITY REGULATOR

William Tamminga, Wallkill, N. Y., assignor to Monitor Process Corporation, Jersey City, N. J., a corporation of New Jersey Application May 7, 1948, Serial No. 25,593

8 Claims. (Cl. 222—382)

This invention relates generally to the dispensing of milk in measured quantities, particularly by the tumbler, as in restaurants, lunch rooms and the like.

Loose milk is commonly transported for this trade in so-called "milk delivery cans," generally of the twenty or forty quart variety. It is delivered in these cans to the retailer who dispenses it to the ultimate purchaser or consumer. Stringent rules and safeguards have been promulgated by the health authorities for the retail dispensing of this milk and among these safeguards is the requirement that the can containing the milk remain closed during the dispensing operation. All parts of the can and the dispensing mechanism associated therewith must be capable of thorough sterilization and the operating parts of the dispensing devices employed must be so constructed as to maintain the milk in a thoroughly sanitary and sterile condition while it is in the can and during the dispensing thereof.

The primary object of the present invention is to provide a highly efficient and sanitary dispensing device adapted to be associated directly with a conventional milk delivery can and capable of dispensing measured quantities of milk from the can in a thoroughly sanitary, simple and efficient manner.

Another object of the invention is to permit the retailer to accurately measure the quantity of milk dispensed, so that the same quantity of milk will be dispensed at each operation, irrespective of the amount of milk which remains in the delivery can.

A further object of the invention is to provide such an apparatus which may be associated directly with conventional delivery cans, so that all parts of the structure may be thoroughly cleaned and sterilized at the creamery where the milk is packaged and delivered in this condition to the retailer.

Heretofore ladles, piston pumps and similar adjuncts have been utilized in the dispensing of measured quantities of milk, but these constructions are not satisfactory for many reasons, chief among which is that they generally embody a number of parts which are difficult to clean and sterilize and cannot be always depended upon to function properly, so as to dispense the same amount of milk at each operation.

The present invention, in contradistinction, utilizes a diaphragm pump with a novel cup shaped diaphragm fitted within a pump cylinder which constitutes a measuring chamber communicating with the interior of the delivery can through a passage or duct leading to the bottom of the can. Suction is communicated to the measuring chamber on the side of the diaphragm opposite to that communicating with the passage, whereby the cup formation of the diaphragm may be reversed to produce a suction in the passage referred to and cause milk within the can to fill the chamber on the reversed cup-shaped side of the diaphragm. The passage leading to the measuring chamber is provided with a check valve which permits of the flow of the milk into the chamber, but precludes retrograde flow of the milk, so that, if pneumatic pressure is thereupon applied to the diaphragm to return it to its original cup shaped condition, milk exhausted through the passage will be caused to flow through a milk delivery tube suitably valved to permit the dispensing of the milk through an associated outlet spout or head.

The amount of milk dispensed at each operation is controlled by limiting the extent to which the cup shaped diaphragm be reversed as stated. A limiting stop is provided for this purpose and this stop is adjustable to engage with the diaphragm when a predetermined quantity of milk has been suction drawn into the measuring chamber to thus limit the milk capacity of said chamber.

The apparatus of this invention is detachably supported in the neck of a conventional can, so that it may be associated with any stock can corresponding in size and may travel with the can to and from the creamery. All parts of the structure can be readily dismantled for cleaning and sterilization, so that the milk is delivered and dispensed in a thoroughly sanitary condition.

Features of the invention, other than those adverted to, will be apparent from the hereinafter detailed description and appended claims, when read in conjunction with the accompanying drawing.

The drawing illustrates one practical embodiment of the invention, but the construction therein shown is to be understood as illustrative, only, and not as defining the limits of the invention.

Figure 1 is a cross sectional view showing the neck of a conventional can with the apparatus of the present invention associated therewith.

Figure 2 is a fragmental transverse section on the line 2—2 of Figure 1.

Referring to the drawings, 1 designates the upper portion of a neck of a conventional milk delivery can provided with the usual lip or bowl 2. Into the neck 1 of the can is fitted a false cover structure similar to the usual umbrella can cover in that it comprises a rim 3 which fits down into the neck of the can and is provided at its upper end with a peripheral umbrella 4 overlapping and overlying the bowl 2. The center portion of this cover, however, is omitted and in its place there is provided, across the rim intermediate its height, a partition 5 which may conveniently be in the form of a casting. This partition 5 is welded, soldered or otherwise permanently secured within the rim 3 and extends entirely across the same, so as to form a closure therefor. Within this partition is cast an upstanding cylindrical guide 6 which extends above and below the plane of symmetry of the partition and within this guide is mounted a dispensing tube.

The dispensing tube comprises two telescoping sections 7 and 8, the latter of which is adapted to extend to substantially the bottom of the can while the former is adapted to extend through a packing gland 9 in the top of the guide 6. The section 8 is provided at its upper end with a packing ring 10 to permit this section to slide up and down in the guide, so as to adjust the lower end of the section to a point adjacent the bottom of the can and at the bottom of this section is a check valve 11. The section 7 telescopes into and is adapted for sliding movement within the section 8 and carries at its upper end a dispensing head 12 formed with a lateral extension 13 having therein an outlet spout 14. An elastic diaphragm 15, preferably of rubber, is stretched across the top of the head and peripherally held in place by a sealing ring 16.

The structure of this dispensing head is substantially that disclosed in my Patent No. 2,272,443, issued February 10, 1942, and it operates in the same manner. When milk is forced upwardly through the section 7, it flexes the diaphragm 15 upwardly sufficiently to permit the milk to flow across under the diaphragm and out through the spout 14. At all other times the elasticity of the diaphragm seals the upper end of the section 7 against the admission of air, dust or other extraneous matter.

During shipment of the can, the section 7 is telescoped to the depressed, full line position shown in Figure 1, but when it is desired to dispense milk through the dispensing tube, the section 7 is raised to the dotted line position shown in this figure and the section 7 may then be axially rotated, so that the spout 14 will direct the outflow of milk in the desired direction.

Positioned laterally of the guide 6 there is formed in the partition 5 a lower section 17 of a two part pump and measuring chamber having an upper section 18. The section 17 is preferably circular in form and from its base a cored channel 19 extends to the interior of the guide 6.

Normally seated within the pump chamber section 6 is a cup shaped diaphragm 20 which conforms with the bottom and sides of the section 17 and the upper edge of this diaphragm is provided with a peripheral elastic bead 21. The diaphragm is preferably of natural or synthetic rubber, so as to be flexible and resilient and it may be associated with the pump chamber section 17 by stretching the upper margin of the diaphragm over an external flange 22 at the upper edge of said section, as illustrated in Figure 1. When thus attached, the bead will hug the exterior of the section below the flange 22 and detachably secure the diaphragm in position.

The upper section 18 of the pump chamber is dished upwardly and is provided at its lower edge with a peripheral flange 23 adapted to seat on the marginal portion of the diaphragm as also shown in Figure 1, the diaphragm here serving as a gasket. The upper section 18 may be tightly clamped to the lower section 17 in any suitable manner, and in Figure 2 a spring wire bale 24 is shown for this purpose. This bale extends over the top of the upper section and is provided with arms 25 terminating in hooks 26 adapted to engage with perforated lugs 27 formed on the upper surface of the partition 5. The bale 24 may be sprung into place and, due to its resiliency, will hold the upper section firmly seated on the lower section. It will of course be understood that other clamping devices may be used and that the clamp shown is merely illustrative.

The upper section is provided with a central exterior boss 28 interiorly threaded to receive a tubular shank 29 of a metering plate 30. This plate is positioned internally of the pump chamber. The outer end of the tubular shank is adapted to receive an air hose through which air pressure or suction may be communicated to the interior of the pump chamber above the cup shaped diaphragm 20.

The rim 3 is provided below the partition 5 with one or more vent holes 31 and it is also provided above the partition with one or more additional holes 32, so that water from melting ice which might otherwise accumulate on the upper surface of the partiton 5 may drain off. The whole structure may, in practice be provided with an umbrella top cover 33 of conventional form adapted to fit into the rim 3 as shown, so as to enclose all of the parts when the can is in transit or storage.

Before filling the can with milk at the creamery, all parts of the structure are dismantled and thoroughly cleaned and sterilized. Milk is introduced into the can in the usual manner and the intermediate umbrella cover with the partition therein is then placed on the can to seal the same. The shipping cover 33 is then brought into position, so that the parts appear as shown in Figure 1. These several parts may be secured together with an appropriate wire seal as is common in the creamery business and the can is delivered to the retailer in this condition with all parts thoroughly sanitary and clean.

To prepare the structure for the dispensing of the milk, the shipping cover is removed and an air hose 34 connected to the outer end of the shank 29. The section 7 of the dispensing tube is then raised from the full line position shown in Figure 1 into the dotted line position thereof. When milk is to be dispensed, suction is communicated through the air hose 34 from any appropriate source through holes 35 at the base of the shank 29 to the interior of the pump chamber above the cup shaped diaphragm 20.

This suction produces a rarefied condition of the air within both sections 17 and 18 of the pump chamber and, as the pressure in this chamber recedes below atmospheric pressure within the can, admitted through the vent 31, the diaphragm will be drawn from the cupped formation shown in full lines in Figure 1 into the reversed cup-shaped form form in dotted lines in that figure. By this operation, suction will be produced within the passage 19 and the atmospheric pressure in the can above the surface of the milk will force the milk from the interior of the can past the check valve 11 upwardly through the dispensing tube section 8 and through the passage 19 into the pump chamber below the reversed diaphragm until the entire space within the chamber below the diaphragm is filled. The capacity of this chamber at this time will have been controlled by rotating the shank 29 to raise or lower the metering plate 30, so as to arrest the operation of reversing the shape of the diaphragm at that point when the capacity of the chamber beneath the same shall correspond to the amount of milk which it is desired to dispense.

When the milk is thus being sucked into the pump chamber, the suction impressed upon the interior of the delivery tube will hold the diaphragm 15 of the dispenser head tightly against the upper end of the dispenser tube section 7 and this latter diaphragm will thus act as a check valve, so that no air can enter at this point for, if air were allowed to enter here, it would break the vacuum in the pump chamber and interfere with the charging of the latter with milk.

When the pump chamber has been filled as stated, suction on the air tube 34 is discontinued and air under pressure is admitted through said tube. This air exerts pressure on the upper surface of the diaphragm and forces it from the inverted cup-shaped condition shown in dotted lines in Figure 1 to its normal cup shape shown in full lines in this figure, thereby evacuating the milk from the pump chamber through passage 19. During this operation, the check valve 11 precludes re-entry of the milk into the interior of the can, and hence the milk is forced upwardly through the dispenser tube section 7, against the diaphragm 15 and lifts said diaphragm sufficiently to allow the milk to flow over the upper surface of the head 12 and out through the spout 14, whereby said milk is dispensed into a tumbler or other receptacle held beneath the spout. The first dispensing operation will prime the all milk conduits, so that each successive operation will dispense correctly measured quantities of milk.

I have referred to the shipment of the can from the creamery or dairy with the upper section 18 of the pump cylinder attached. This need not be so for, in practice, this section 18 may be part and parcel of the retailer's equipment and it may be attached to the lower section 17 of the structure after the shipping cover is removed. This is possible because the upper surface of the cup-shaped diaphragm 20 never comes in contact with the milk and the milk is thus at all times sealed, even though the can is shipped without the upper section 18 of the pump cylinder.

The retailer's equipment may embody any suitable apparatus for alternately producing the suction and compression necessary to the dispensing of milk according to the present invention. A simple reciprocating pump with a piston movable in one direction to produce suction and in the other direction to produce compressed air will suffice and this pump may be manually or mechanically driven without departing from the present invention. The amount of suction or compressed air admitted is not critical for the metering plate will effectually control the maximum measuring capacity of the pump chamber when suction is applied while the inner surface of the lower section 17 of said chamber will effectually limit the normal shape of the cup shaped diaphragm irrespective of the pressure applied thereto, within of course reasonable limits.

The foregoing detailed description sets forth the invention in its preferred practical form, but the invention is to be understood as fully commensurate with the appended claims.

Having thus fully described the invention, what I claim as new and desire to secure by Letters Patent is:

1. A milk can provided at its top with a closure extending across the mouth of the can, a dispensing tube extending downwardly through said closure into the can, said tube being provided at its inner end with a check valve to permit milk to enter the tube from the interior of the can and provided at its outer end with a check valve to preclude the entrance of air into the tube but to permit the exit of milk therefrom, a cylindrical walled pump chamber carried by said closure and divided intermediate its upper and lower portions into opposing cylindrical cup-shaped sections, the base of the lower section being connected by a conduit to the interior of the dispensing tube, a cylindrical cup-shaped diaphragm normally seated within the lower section of the pump chamber and conforming substantially to the shape of said section, and a duct leading through the wall of the upper section of said chamber for communicating suction and pressure alternately to the interior of said chamber above the cup-shaped diaphragm therein to respectively invert the cup-shaped diaphragm to draw milk from the can through the check valve at the lower end of the dispensing tube into the pump chamber below the diaphragm and to return the diaphragm to normal cup-shaped condition with accompanying evacuation of the milk through the check valve at the upper end of the dispensing tube.

2. A milk can provided at its top with a closure extending across the mouth of the can, a dispensing tube comprising telescoping sections one of which extends downwardly to the base of the can and is provided with a check valve and the other of which is provided at its upper end with a valved outlet spout and is vertically adjustable through said closure, a substantially cylindrical measuring chamber carried by the closure, a cup-shaped diaphragm secured to the wall of the measuring chamber substantially midway of the height of the latter and normally occupying a depressed cup-shaped condition conforming substantially to the shape of the lower half of said chamber, there being a duct leading from the base of the chamber to the interior of the lower section of the dispensing tube, and an air inlet leading into the upper portion of said chamber above said cup-shaped diaphragm and through which suction may be communicated into the chamber to reverse the cup shape of the diaphragm into inverted condition to draw milk into the chamber and also through which pressure may be thereupon exerted on the diaphragm to return it to its normal cup-shaped condition to expel the milk from the chamber through said outlet spout of the dispensing tube.

3. A milk can provided at its top with a closure extending across the mouth of the can, a dispensing tube comprising telescoping sections one of which extends downwardly to the base of the can and is provided with a check valve and the other of which is provided at its upper end with a valved outlet spout and is vertically adjustable through said closure, a substantially cylindrical measuring chamber carried by the closure, a cup-shaped diaphragm secured to the wall of the measuring chamber susbtantially midway of the height of the latter and normally occupying a depressed cup-shaped condition conforming substantially to the shape of the lower half of said chamber, there being a duct leading from the base of the chamber to the interior of the lower section of the dispensing tube, an air inlet leading into the upper portion of said chamber above said cup-shaped diaphragm and through which suction may be communicated into the chamber to reverse the cup shape of the diaphragm into inverted condition to draw milk into the chamber and also through which pressure may be thereupon exerted on the diaphragm to return it to its normal cup-shaped condition to expel the milk from the chamber through said outlet spout of the dispensing tube, and a metering plate positioned in the upper portion of said chamber and adjustable axially thereof to control the extent to which the diaphragm may be inverted and thus control the milk capacity of said chamber.

4. A milk can provided at its top with a closure extending across the mouth of the can, a dispensing tube extending downwardly through said closure into the can, said tube being provided at its inner end with a check valve to permit milk to enter the tube from the interior of the can and provided at its outer end with a check valve to preclude the entrance of air into the tube but to permit the exit of milk therefrom, a cylindrical walled pump chamber carried by said closure and divided intermediate its upper and lower portions into opposing cylindrical cup-shaped sections, the base of the lower section being connected by a conduit to the interior of the dispensing tube, a cylindrical cup-shaped diaphragm normally seated within the lower section of the pump chamber and occupying a depressed cylindrical cup-shaped position therein, a duct leading through the wall of the upper section of said chamber for communicating suction and pressure alternately to the interior of said chamber above the cup-shaped diaphragm therein to respectively invert the cup-shaped diaphragm to draw milk from the can through the check valve at the lower end of the dispensing tube into the pump chamber below the diaphragm and to return the diaphragm to normal cup-shaped condition with accompanying evacuation of the milk through the check valve at the upper end of the dispensing tube, and a metering plate positioned in the upper portion of said chamber and adjustable axially thereof to control the extent to which the diaphragm may be inverted and thus control the milk capacity of said chamber.

5. A milk can closed at its top with a removable false cover comprising a rim interfitting with the neck of the can and having a partition across the same, an upright guide carried by said partition, a dispensing tube mounted for vertical adjustment in the guide and comprising two sections one of which extends upwardly through the guide and the other of which extends downwardly to the bottom of the can, said sections being provided at their distant ends with check valves, a substantially cylindrical pump chamber carried by said partition and comprising upper and lower sections, the interior of the lower section having a duct connection with the interior of the guide and the upper section having a duct through which air may be exhausted and introduced into the chamber, and a cup-shaped diaphragm normally seated in the lower section with its upper peripheral edges clamped between said sections whereby air may be exhausted from the upper section to invert the diaphragm to draw milk into the interior of the chamber below the diaphragm when suction is impressed upon the diaphragm and to exhaust the milk from the chamber through the upper end of the dispensing tube when air under pressure is impressed upon said diaphragm.

6. A milk can closed at its top with a removable false cover comprising a rim interfitting with the neck of the can and having a partition across the same, an upright guide carried by said partition, a dispensing tube mounted for vertical adjustment in the guide and comprising two sections one of which extends upwardly through the guide and the other of which extends downwardly to the bottom of the can, said sections being provided at their distant ends with check valves, a substantially cylindrical pump chamber carried by said partition and comprising upper and lower sections, the interior of the lower section having a duct connection with the interior of the guide and the upper section having a duct through which air may be exhausted and introduced into the chamber, a cup-shaped diaphragm normally seated in the lower section with its upper peripheral edges clamped between said sections whereby air may be exhausted from the upper section to invert the diaphragm to draw milk into the interior of the chamber below the diaphragm when suction is impressed upon the diaphragm and to exhaust the milk from the chamber through the upper end of the dispensing tube when air under pressure is impressed upon said diaphragm, and a shipping cover detachably interfitted with the false cover.

7. A milk can provided at its top with a closure, a walled cylindrical pump chamber on the closure, said chamber being divided substantially midway of its depth into upper and lower cup-shaped compartments by a flexible cup-shaped diaphragm normally seated in the lower compartment and conforming to the interior cylindrical cup shape thereof, said lower compartment having a check valved inlet leading from the bottom of the interior of the can and a check valved outlet leading to the exterior of the can and the upper compartment being provided with a duct communicating suction and pressure alternately to the upper compartment to invert the diaphragm upon communication of suction and to return the diaphragm to its normal position upon communication of pressure.

8. A milk can provided at its top with a closure, a walled cylindrical pump chamber on the closure, said chamber being divided substantially midway of its depth into upper and lower cup-shaped compartments by a flexible cup-shaped diaphragm normally seated in the lower compartment and conforming to the interior cylindrical cup shape thereof, said lower compartment having a check valved inlet leading from the bottom of the interior of the can and a check valved outlet leading to the exterior of the can and the upper compartment being provided with a duct communicating suction and pressure alternately to the upper compartment to invert the diaphragm upon communication of suction and to return the diaphragm to its normal position upon communication of pressure, and a metering plate positioned in the upper portion of the upper compartment and adjustable axially thereof to control the extent to which the diaphragm may be inverted and thus control the milk capacity of said chamber.

WILLIAM TAMMINGA.

REFERENCES CITED

The following references are of record in the file of this patent:

UNITED STATES PATENTS

| Number | Name | Date |
| --- | --- | --- |
| 1,627,257 | Stevens | May 3, 1927 |
| 1,767,354 | Eastes | June 24, 1930 |
| 2,170,720 | Kestenbaum | Aug. 22, 1939 |
| 2,188,646 | Bunch | June 30, 1940 |
| 2,272,443 | Tamminga | Feb. 10, 1942 |
| 2,431,534 | Benner | Nov. 25, 1947 |

FOREIGN PATENTS

| Number | Country | Date |
| --- | --- | --- |
| 43,959 | France | July 9, 1934 |

(Addition to No. 746,400)